(12) United States Patent
Nishio et al.

(10) Patent No.: US 11,522,216 B2
(45) Date of Patent: *Dec. 6, 2022

(54) SOLID ELECTROLYTE MATERIAL AND BATTERY

(71) Applicant: Panasonic Intellectual Property Management Co., Ltd., Osaka (JP)

(72) Inventors: Yusuke Nishio, Osaka (JP); Tetsuya Asano, Nara (JP); Akihiro Sakai, Nara (JP); Masashi Sakaida, Hyogo (JP); Akinobu Miyazaki, Osaka (JP); Shinya Hasegawa, Kyoto (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 280 days.

This patent is subject to a terminal disclaimer.

(21) Appl. No.: 16/914,332

(22) Filed: Jun. 27, 2020

(65) Prior Publication Data

US 2020/0328466 A1 Oct. 15, 2020

Related U.S. Application Data

(63) Continuation of application No. PCT/JP2018/045238, filed on Dec. 10, 2018.

(30) Foreign Application Priority Data

Jan. 5, 2018 (JP) .............................. JP2018-000431

(51) Int. Cl.
*H01M 10/0562* (2010.01)
*C01F 17/36* (2020.01)
(Continued)

(52) U.S. Cl.
CPC ......... *H01M 10/0562* (2013.01); *H01M 4/13* (2013.01); *H01M 10/0525* (2013.01); *H01M 2004/027* (2013.01); *H01M 2004/028* (2013.01)

(58) Field of Classification Search
None
See application file for complete search history.

(56) References Cited

U.S. PATENT DOCUMENTS 4,714,664 A * 12/1987 Laustsen ................. H01M 6/14
429/105
2011/0045355 A1* 2/2011 Ichikawa .............. H01M 4/043
429/231.95

(Continued)

FOREIGN PATENT DOCUMENTS

CN 110137561 * 8/2019 ........ H01M 10/0525
JP 2011-129312 6/2011
(Continued)

OTHER PUBLICATIONS

English translation of CN 110137561 (Year: 2019).*
(Continued)

*Primary Examiner* — Yoshitoshi Takeuchi
(74) *Attorney, Agent, or Firm* — McDermott Will & Emery LLP

(57) ABSTRACT

A solid electrolyte material is represented by the following compositional formula (1):

$$Li_{3-3\delta-2a}Y_{1+\delta-a}M_aCl_{6-x-y}Br_xI_y$$

where, M is at least one selected from the group consisting of Ta and Nb; and $-1<\delta<1$, $0<a<1.2$, $0<(3-3\delta-2a)$, $0<(1+\delta-a)$, $0\leq x\leq 6$, $0\leq y\leq 6$, and $(x+y)\leq 6$ are satisfied.

6 Claims, 3 Drawing Sheets

(51) Int. Cl.
　　　*H01M 4/13*　　　(2010.01)
　　　*H01M 10/0525*　(2010.01)
　　　*H01M 4/02*　　　(2006.01)

(56) References Cited

U.S. PATENT DOCUMENTS

| | | |
|---|---|---|
| 2011/0081580 A1 | 4/2011 | Stadler et al. |
| 2012/0301796 A1 | 11/2012 | Ohtomo et al. |
| 2019/0006700 A1 | 1/2019 | Makino et al. |
| 2022/0149430 A1* | 5/2022 | Choi ............... H01M 4/366 |

FOREIGN PATENT DOCUMENTS

| | | | |
|---|---|---|---|
| WO | 2017/154851 A1 | 9/2017 | |
| WO | WO-2021198183 A1 * | 10/2021 | ............ C01F 13/36 |

OTHER PUBLICATIONS

English Translation of Chinese Search Report dated Jul. 5, 2021 for the related Chinese Patent Application No. 201880070255.1.
International Search Report of PCT application No. PCT/JP2018/045238 dated Feb. 5, 2019.
Andreas Bohnsack et al., "The bromides Li3MBr6 (M=Sm—Lu,Y): Synthesis, Crystal Structure, and Ionic Mobility", Journal of Inorganic and General Chemistry, Sep. 1997, vol. 623/Issue 9, pp. 1352-1356.
Andreas Bohnsack et al., "Ternary Chlorides of the Rare-Earth Elements with Lithium, Li3MCl6 (M=Tb—Lu, Y, Sc): Synthesis, Crystal Structures, and Ionic Motion", Journal of Inorganic and General Chemistry, Jul. 1997, vol. 623/Issue 7, pp. 1067-1073.
Indian Examination Report dated Mar. 26, 2022 for the related Indian Patent Application No. 202047027474.

* cited by examiner

SOLID ELECTROLYTE MATERIAL AND BATTERY

BACKGROUND

1. Technical Field

The present disclosure relates to a solid electrolyte material and a battery.

2. Description of the Related Art

Japanese Unexamined Patent Application Publication No. 2011-129312 discloses an all-solid battery using a sulfide solid electrolyte.

Z. Anorg. Allg. Chem., 623 (1997), 1067-1073 discloses $Li_3YCl_6$.

Z. Anorg. Allg. Chem., 623 (1997), 1352-1356 discloses $Li_3YBr_6$.

SUMMARY

In one general aspect, the techniques disclosed here feature a solid electrolyte material in an aspect of the present disclosure is represented by the following compositional formula (1): $Li_{3-3\delta-2a}Y_{1+\delta-a}M_aCl_{6-x-y}Br_xI_y$, where, M is at least one selected from the group consisting of Ta and Nb; and $-1<\delta<1$, $0<a<1.2$, $0<(3-3\delta-2a)$, $0<(1+\delta-a)$, $0 \leq x \leq 6$, $0 \leq y \leq 6$, and $(x+y) \leq 6$ are satisfied.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION

Figure 1:
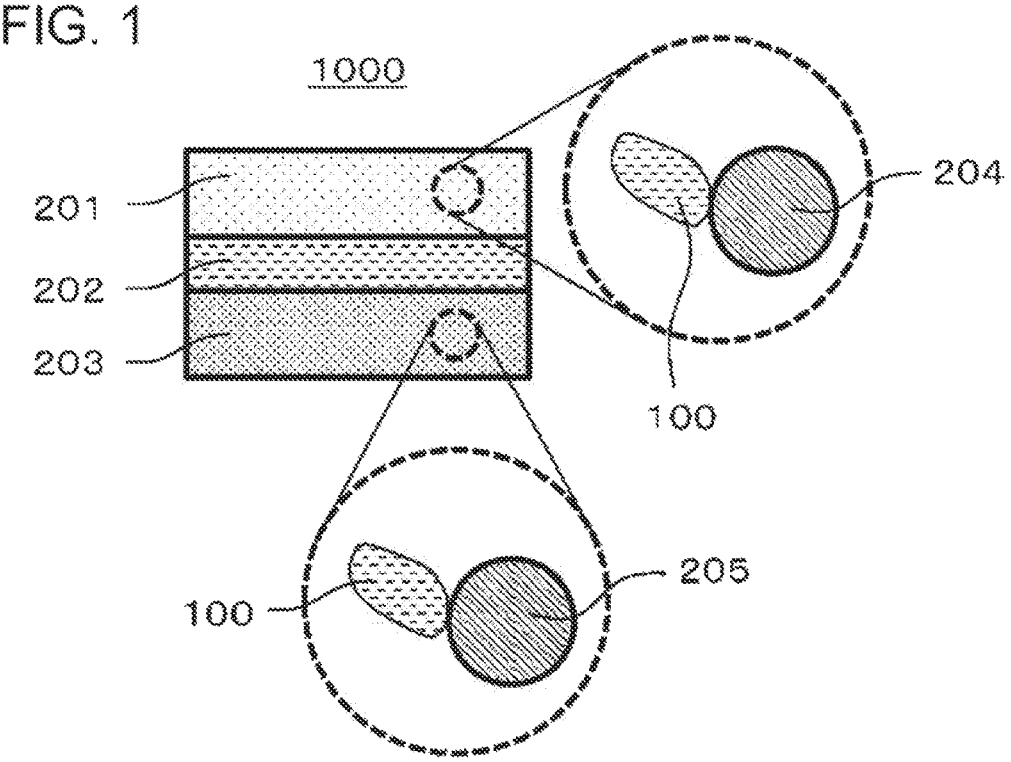
FIG. 1 is a cross-sectional view illustrating a schematic structure of the battery according to Embodiment 2.

Embodiments of the present disclosure will now be described with reference to the drawings.

Embodiment 1

The solid electrolyte material according to Embodiment 1 is a solid electrolyte material represented by the following compositional formula (1):

where, M is at least one selected from the group consisting of Ta and Nb; and also $-1<\delta<1$, $0<a<1.2$, $0<(3-3\delta-2a)$, $0<(1+\delta-a)$, $0 \leq x \leq 6$, $0 \leq y \leq 6$, and $(x+y) \leq 6$ are satisfied.

According to the composition described above, a halide solid electrolyte material that is a solid electrolyte material having high lithium ion conductivity can be realized.

In addition, according to the composition described above, an all-solid secondary battery having excellent charge and discharge characteristics can be realized by using the solid electrolyte material of Embodiment 1. Moreover, a sulfur-free all-solid secondary battery can be realized by using the solid electrolyte material of Embodiment 1. That is, the solid electrolyte material of Embodiment 1 does not have a composition (for example, the composition of Japanese Unexamined Patent Application Publication No. 2011-129312) that generates hydrogen sulfide when exposed to the atmosphere. Consequently, an all-solid secondary battery not generating hydrogen sulfide and having excellent safety can be realized.

Incidentally, the solid electrolyte material according to Embodiment 1 may satisfy, in the compositional formula (1), $0.025 \leq a \leq 0.7$.

According to the composition described above, a solid electrolyte material having higher lithium ion conductivity can be realized.

Incidentally, the solid electrolyte material according to Embodiment 1 may satisfy, in the compositional formula (1), $0.05 \leq a \leq 0.5$.

According to the composition described above, a solid electrolyte material having higher lithium ion conductivity can be realized.

Incidentally, the solid electrolyte material according to Embodiment 1 may satisfy, in the compositional formula (1), $-0.5 \leq \delta \leq 0.5$.

According to the composition described above, a solid electrolyte material having higher lithium ion conductivity can be realized.

Incidentally, the solid electrolyte material according to Embodiment 1 may satisfy, in the compositional formula (1), $-0.3 \leq \delta \leq 0.2$.

According to the composition described above, a solid electrolyte material having higher lithium ion conductivity can be realized.

Furthermore, the solid electrolyte material according to Embodiment 1 may be crystalline or amorphous.

In addition, the shape of the solid electrolyte material according to Embodiment 1 is not particularly limited and may be, for example, acicular, spherical, or elliptic spherical. For example, the solid electrolyte material according to Embodiment 1 may be a particle or may be formed into a pellet of a plate by stacking a plurality of particles and then pressurizing it.

For example, when the solid electrolyte material according to Embodiment 1 has a particle shape (for example, spherical shape), the median diameter may be 0.1 μm or more and 100 μm or less.

In addition, in Embodiment 1, the median diameter may be 0.5 μm or more and 10 μm or less.

According to the configuration described above, the ion conductivity can be further enhanced. In addition, a better dispersion state of the solid electrolyte material according to Embodiment 1 with an active material and so on can be formed.

In addition, in Embodiment 1, the solid electrolyte material may be smaller than the median diameter of the active material.

According to the configuration described above, a better dispersion state of the solid electrolyte material according to Embodiment 1 with an active material and so on can be formed.

The solid electrolyte material according to Embodiment 1 can be manufactured by, for example, the following method.

Binary halide raw material powders are prepared so as to give a desired compositional ratio. For example, when $Li_{2.8}Y_{0.9}Ta_{0.1}Cl_6$ is produced, LiCl, $YCl_3$, and $TaCl_5$ are prepared in a molar ratio of about 2.8:0.9:0.1. Considering the change in the composition during the synthesis process, the compounding ratio may be adjusted in advance to offset the change. The above-mentioned values, "δ", "a", "x", and "y" can be adjusted by adjusting the raw materials, compounding ratio, and synthesis process.

The raw material powders are thoroughly mixed and are then mixed, pulverized, and reacted with each other using a method of mechanochemical milling. Subsequently, the reaction product may be burned in vacuum or in an inert atmosphere.

Alternatively, the raw material powders may be burned in vacuum or in an inert atmosphere after being thoroughly mixed. The burning conditions may be, for example, burning within a range of 100° C. to 650° C. for 1 hour or more.

Consequently, a solid electrolyte material including a composition as described above can be obtained.

Embodiment 2

Embodiment 2 will now be described. Description overlapping with the above-described Embodiment 1 will be appropriately omitted.

The battery according to Embodiment 2 is configured using the solid electrolyte material described in Embodiment 1.

The battery according to Embodiment 2 includes a positive electrode, a negative electrode, and an electrolyte layer.

The electrolyte layer is a layer provided between the positive electrode and the negative electrode.

At least one of the positive electrode, the electrolyte layer, and the negative electrode includes the solid electrolyte material according to Embodiment 1.

According to the configuration described above, the charge and discharge characteristics of the battery can be improved.

A specific example of the battery according to Embodiment 2 will now be described.

FIG. 1 is a cross-sectional view illustrating a schematic structure of the battery 1000 according to Embodiment 2.

The battery 1000 according to Embodiment 2 includes a positive electrode 201, a negative electrode 203, and an electrolyte layer 202.

The positive electrode 201 includes a positive electrode active material particle 204 and a solid electrolyte particle 100.

The electrolyte layer 202 is disposed between the positive electrode 201 and the negative electrode 203.

The electrolyte layer 202 includes an electrolyte material (for example, solid electrolyte material).

The negative electrode 203 includes a negative electrode active material particle 205 and a solid electrolyte particle 100.

The solid electrolyte particle 100 is a particle made of the solid electrolyte material according to Embodiment 1 or a particle including the solid electrolyte material according to Embodiment 1 as a main component.

The positive electrode 201 includes a material that has a property of storing and releasing metal ions (for example, lithium ions). The positive electrode 201 includes, for example, a positive electrode active material (for example, the positive electrode active material particle 204).

As the positive electrode active material, for example, a lithium-containing transition metal oxide (for example, $Li(NiCoAl)O_2$ or $LiCoO_2$), a transition metal fluoride, a polyanion material, a fluorinated polyanion material, a transition metal sulfide, a transition metal oxyfluoride, a transition metal oxysulfide, or a transition metal oxynitride can be used.

The positive electrode active material particle 204 may have a median diameter of 0.1 μm or more and 100 μm or less. When the median diameter of the positive electrode active material particle 204 is 0.1 μm or more, the positive electrode active material particle 204 and the halide solid electrolyte material can form a good dispersion state in the positive electrode. Consequently, the charge and discharge characteristics of the battery are improved. In addition, when the median diameter of the positive electrode active material particle 204 is 100 μm or less, the lithium diffusion in the positive electrode active material particle 204 is accelerated. Consequently, the battery can operate with high output.

The median diameter of the positive electrode active material particle 204 may be larger than the median diameter of the halide solid electrolyte material. Consequently, a good dispersion state of the positive electrode active material particle 204 and the halide solid electrolyte material can be formed.

Regarding the volume ratio of the positive electrode active material particle 204 and the halide solid electrolyte material contained in the positive electrode 201, "v: 100–v", v may be 30≤v≤95. When 30≤v, it is possible to secure a sufficient energy density of the battery. In addition, when v≤95, high output operation can be realized.

The positive electrode 201 may have a thickness of 10 μm or more and 500 μm or less. Incidentally, when the thickness of the positive electrode 201 is 10 μm or more, it is possible to secure a sufficient energy density of the battery. In addition, when the thickness of the positive electrode 201 is 500 μm or less, high output operation can be realized.

The electrolyte layer 202 is a layer including an electrolyte material. The electrolyte material is, for example, a solid electrolyte material. That is, the electrolyte layer 202 may be a solid electrolyte layer.

Furthermore, the solid electrolyte layer may include the solid electrolyte material according to Embodiment 1 as a main component. That is, the solid electrolyte layer may include the solid electrolyte material according to Embodiment 1, for example, in a weight proportion of 50% or more (50 wt % or more) based on the total amount of the solid electrolyte layer.

According to the composition described above, the charge and discharge characteristics of the battery can be further improved.

In addition, the solid electrolyte layer may include the solid electrolyte material according to Embodiment 1, for example, in a weight proportion of 70% or more (70 wt % or more) based on the total amount of the solid electrolyte layer.

According to the composition described above, the charge and discharge characteristics of the battery can be further improved.

Furthermore, the solid electrolyte layer, while including the solid electrolyte material according to Embodiment 1 as a main component, may further include inevitable impurities or a starting material used in the synthesis of the solid electrolyte material, a by-product, a decomposition product, or the like.

In addition, the solid electrolyte layer may include the solid electrolyte material according to Embodiment 1, for example, in a weight proportion of 100% (100 wt %) based on the total amount of the solid electrolyte layer excluding unavoidable impurities.

According to the composition described above, the charge and discharge characteristics of the battery can be further improved.

As described above, the solid electrolyte layer may be made of only the solid electrolyte material according to Embodiment 1.

Alternatively, the solid electrolyte layer may be made of only a solid electrolyte material that is different from the solid electrolyte material according to Embodiment 1, As the solid electrolyte material that is different from the solid electrolyte material according to Embodiment 1, for example, $Li_2MgX_4$, $Li_2FeX_4$, $Li(Al,Ga,In)X_4$, $Li_3(Al,Ga,In)X_6$, LiI (where X is Cl, Br, or I) can be used.

The solid electrolyte layer may include both the solid electrolyte material according to Embodiment 1 and a solid electrolyte material different from the solid electrolyte material according to Embodiment 1. In such a case, both may be uniformly dispersed. A layer made of the solid electrolyte material according to Embodiment 1 and a layer made of a solid electrolyte material different from the solid electrolyte material according to Embodiment 1 may be serially disposed in the stacking direction of the battery.

The solid electrolyte layer may have a thickness of 1 μm or more and 100 μm or less. When the thickness of the solid electrolyte layer is 1 μm or more, it is possible to separate between the positive electrode 201 and the negative electrode 203. In addition, when the thickness of the solid electrolyte layer is 100 μm or less, high output operation can be realized.

The negative electrode 203 includes a material that has a property of storing and releasing metal ions (for example, lithium ions). The negative electrode 203 include, for example, a negative electrode active material (for example, the negative electrode active material particle 205).

As the negative electrode active material, for example, a metal material, a carbon material, an oxide, a nitride, a tin compound, or a silicon compound can be used. The metal material may be a single metal. Alternatively, the metal material may be an alloy. Examples of the metal material include a lithium metal and a lithium alloy. Examples of the carbon material include natural graphite, coke, graphitizing carbon, carbon fiber, spherical carbon, artificial graphite, and amorphous carbon. From the viewpoint of capacity density, silicon (Si), tin (Sn), a silicon compound, or a tin compound may be used. When a negative electrode active material having a low average reaction voltage is used, the electrolysis-suppressing effect by the solid electrolyte material according to Embodiment 1 is further well shown.

The negative electrode active material particle 205 may have a median diameter of 0.1 μm or more and 100 μm or less. When the median diameter of the negative electrode active material particle 205 is 0.1 μm or more, the negative electrode active material particle 205 and the solid electrolyte particle 100 can form a good dispersion state in the negative electrode. Consequently, the charge and discharge characteristics of the battery are improved. In addition, when the median diameter of the negative electrode active material particle 205 is 100 μm or less, the lithium diffusion in the negative electrode active material particle 205 is accelerated. Consequently, the battery can operate with high output.

The median diameter of the negative electrode active material particle 205 may be larger than that of the solid electrolyte particle 100. Consequently, the negative electrode active material particle 205 and the halide solid electrolyte material can form a good dispersion state.

Regarding the volume ratio of the negative electrode active material particle 205 and the solid electrolyte particle 100 contained in the negative electrode 203, "v: 100−v", v may be 30≤v≤95. When 30≤v, it is possible to secure a sufficient energy density of the battery. In addition, when v≤95, high output operation can be realized.

The negative electrode 203 may have a thickness of 10 μm or more and 500 μm or less. When the thickness of the negative electrode is 10 μm or more, it is possible to secure a sufficient energy density of the battery. In addition, when the thickness of the negative electrode is 500 μm or less, high output operation can be realized.

At least one of the positive electrode 201, the electrolyte layer 202, and the negative electrode 203 may include a sulfide solid electrolyte or an oxide solid electrolyte in order to enhance the ion conductivity or chemical stability/electrochemical stability. As the sulfide solid electrolyte, for example, $Li_2S$—$P_2S_5$, $Li_2S$—$SiS_2$, $Li_2S$—$B_2S_3$, $Li_2S$—$GeS_2$, $Li_{3.25}Ge_{0.25}P_{0.75}S_4$, or $Li_{10}GeP_2S_{12}$ can be used. As the oxide solid electrolyte, for example, an NASICON-type solid electrolyte represented by $LiTi_2(PO_4)_3$ or an element substitute thereof; a $(LaLi)TiO_3$-based perovskite solid electrolyte; an LISICON-type solid electrolyte represented by $Li_{14}ZnGe_4O_{16}$, $Li_4SiO_4$, and $LiGeO_4$, or element substitutes thereof; a garnet-type solid electrolyte represented by $Li_7La_3Zr_2O_{12}$ or an element substitute thereof; a $Li_3N$ or an H substitute thereof; or $Li_3PO_4$ or an N substitute thereof can be used.

At least one of the positive electrode 201, the electrolyte layer 202, and the negative electrode 203 may include an organic polymer solid electrolyte in order to enhance the ion conductivity. As the organic polymer solid electrolyte, for example, a compound of a polymer compound and a lithium salt can be used. The polymer compound may have an ethylene oxide structure. A compound having the ethylene oxide structure can contain a large amount of a lithium salt and can further enhance the ionic electrical conductivity. As the lithium salt, for example, $LiPF_6$, $LiBF_4$, $LiSbF_6$, $LiAsF_6$, $LiSO_3CF_3$, $LiN(SO_2CF_3)_2$, $LiN(SO_2C_2F_5)_2$, $LiN(SO_2CF_3)(SO_2C_4F_9)$, or $LiC(SO_2CF_3)_3$ can be used. As the lithium salt, one lithium salt selected from these lithium salts can be used alone. Alternatively, as the lithium salt, a mixture of two or more lithium salts selected from these lithium salts can be used.

At least one of the positive electrode 201, the electrolyte layer 202, and the negative electrode 203 may include a nonaqueous electrolyte solution, a gel electrolyte, and an ionic liquid in order to facilitate the transfer of lithium ions and improve the output characteristics of the battery.

The nonaqueous electrolyte solution includes a nonaqueous solvent and a lithium salt dissolved in the nonaqueous solvent. As the nonaqueous solvent, for example, a cyclic carbonate ester solvent, a chain carbonate ester solvent, a cyclic ether solvent, a chain ether solvent, a cyclic ester solvent, a chain ester solvent, or a fluorine solvent can be used. Examples of the cyclic carbonate ester solvent include ethylene carbonate, propylene carbonate, and butylene carbonate. Examples of the chain carbonate ester solvent include dimethyl carbonate, ethyl methyl carbonate, and diethyl carbonate. Examples of the cyclic ether solvent include tetrahydrofuran, 1,4-dioxane, and 1,3-dioxolane. Examples of the chain ether solvent include 1,2-dimethoxyethane and 1,2-diethoxyethane. Examples of the cyclic ester solvent include γ-butyrolactone. Examples of the chain ester solvent include methyl acetate. Examples of the fluorine solvent include fluoroethylene carbonate, methyl fluoropropionate, fluorobenzene, fluoroethyl methyl carbonate, and fluorodimethylene carbonate. As the nonaqueous solvent, one nonaqueous solvent selected from these solvents can be used alone. Alternatively, as the nonaqueous solvent, a combination of two or more nonaqueous solvents selected from these solvents can be used. The nonaqueous electrolyte solution may include at least one fluorine solvent selected from the group consisting of fluoroethylene carbonate, methyl fluoropropionate, fluorobenzene, fluoroethyl methyl carbonate, and fluorodimethylene carbonate. As the lithium salt, for example, $LiPF_6$, $LiBF_4$, $LiSbF_6$, $LiAsF_6$, $LiSO_3CF_3$, $LiN(SO_2CF_3)_2$, $LiN(SO_2C_2F_6)_2$, $LiN(SO_2CF_3)(SO_2C_4F_9)$, or $LiC(SO_2CF_3)_3$ can be used. As the lithium salt, one lithium salt selected from these salts can be used alone. Alternatively, as the lithium salt, a mixture of two or more lithium salts selected from these salts can be used. The concentration of the lithium salt is, for example, within a range of 0.5 to 2 mol/L.

As the gel electrolyte, an electrolyte prepared by impregnating a polymer material with a nonaqueous electrolyte solution can be used. As the polymer material, for example, polyethylene oxide, polyacrylonitrile, polyvinylidene fluoride, polymethyl methacrylate, and a polymer having an ethylene oxide bond may be used.

The cation constituting the ionic liquid may be, for example, an aliphatic chain quaternary salt, such as tetraalkylammonium and tetraalkylphosphonium; an aliphatic cyclic ammonium, such as pyrrolidiniums, morpholiniums, imidazoliniums, tetrahydropyrimidiniums, piperaziniums, and pyperidiniums; or a nitrogen-containing heterocyclic aromatic cation, such as pyridiniums and imidazoliniums. The anion constituting the ionic liquid may be, for example, $PF_6^-$, $BF_4^-$, $SbF_6^-$, $AsF_6^-$, $SO_3CF_3^-$, $N(SO_2CF_3)_2^-$, $N(SO_2C_2F_5)_2^-$, $N(SO_2CF_3)(SO_2C_4F_9)^-$, or $C(SO_2CF_3)_3^-$, In addition, the ionic liquid may contain a lithium salt.

At least one of the positive electrode 201, the electrolyte layer 202, and the negative electrode 203 may include a binder in order to improve the adhesion between particles. The binder is used for improving the binding property of the material constituting an electrode. Examples of the binder include polyvinylidene fluoride, polytetrafluoroethylene, polyethylene, polypropylene, aramid resin, polyamide, polyimide, polyamideimide, polyacrylonitrile, polyacrylic acid, methyl polyacrylate ester, ethyl polyacrylate ester, hexyl polyacrylate ester, polymethacrylic acid, methyl polymethacrylate ester, ethyl polymethacrylate ester, hexyl polymethacrylate ester, polyvinyl acetate, polyvinyl pyrrolidone, polyether, polyether sulfone, hexafluoropolypropylene, styrene butadiene rubber, and carboxymethyl cellulose. In addition, as the binder, a copolymer of two or more materials selected from tetrafluoroethylene, hexafluoroethylene, hexafluoropropylene, perfluoroalkyl vinyl ether, fluorinated vinylidene, chlorotrifluoroethylene, ethylene; propylene, pentafluoropropylene; fluoromethyl vinyl ether, acrylic acid, and hexadiene can be used. In addition, a mixture of two or more selected from these compounds may be used as the binder.

In addition, at least one of the positive electrode 201 and the negative electrode 203 may include a conductive agent as necessary.

The conductive agent is used in order to reduce electrode resistance. Examples of the conductive agent include graphite, such as natural graphite and artificial graphite; carbon blacks, such as acetylene black and ketjen black; conductive fibers, such as carbon fiber and metal fiber; metal powders, such as fluorinated carbon and aluminum; conductive whiskers, such as zinc oxide and potassium titanate; conductive metal oxides, such as titanium oxide; and conductive polymer compounds, such as polyaniline, polypyrrole, and polythiophene. Furthermore, cost reduction can be achieved by using a carbon conductive agent as the conductive agent.

Furthermore, the battery according to Embodiment 2 can be configured as a battery of various shapes, such as a coin-type, a cylindrical type; a square type, a sheet type, a button type, a flat type, and a stacked type.

EXAMPLES

The details of the present disclosure will now be described using examples and comparative examples.

Example 1

Production of Solid Electrolyte Material

Raw material powders of LiCl, $YCl_3$, and $TaCl_5$ were weighed in a molar ratio of $LiCl:YCl_3:TaCl_5=2.9:6.95:0.05$ in an argon atmosphere of a dew point of −60° C. or less. These powders were pulverized and mixed in a mortar and then subjected to milling treatment using a planetary ball mill at 600 rpm for 25 hours.

According to the above, a powder of a solid electrolyte material of Example 1 represented by a compositional formula: $Li_{2.9}Y_{0.95}Ta_{0.05}Cl_6$, was obtained.

The content of Li per unit weight of the whole solid electrolyte material of Example 1 was measured by atomic absorption spectrometry, the content of Y was measured by ICP emission spectrometry, and the contents of Li:Y:Ta were converted into a molar ratio. The ratio of Li:Y:Ta was 2.9:6.95:0.05; which was the same as the charge ratio.

Evaluation of Lithium Ion Conductivity

Figure 2:
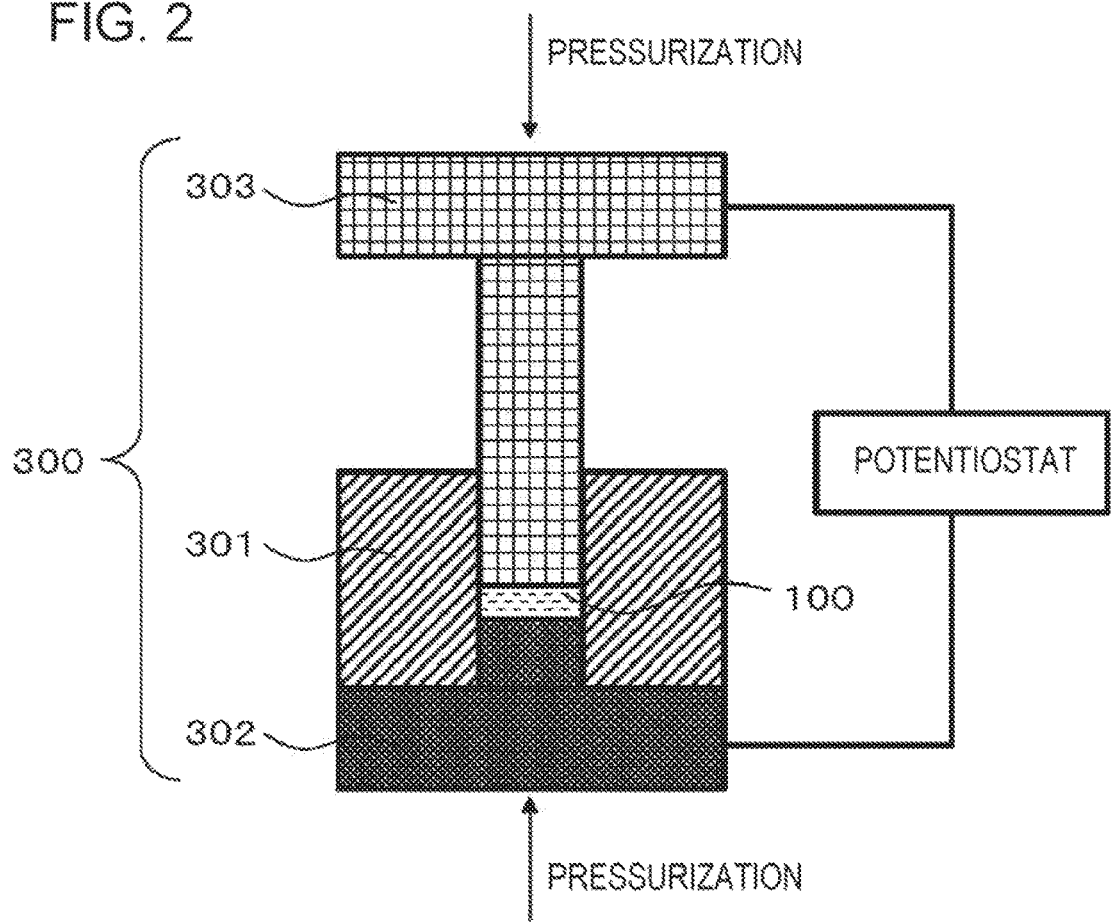
FIG. 2 is a schematic diagram illustrating a method for evaluating ion conductivity.

FIG. 2 is a schematic diagram illustrating a method for evaluating ion conductivity.

The pressure molding dies 300 are composed of an electronically insulative polycarbonate frame 301 and electronically conductive stainless steel upper punch 303 and lower punch 302.

The ion conductivity was evaluated using the structure shown in FIG. 2 by the following method.

A powder of the solid electrolyte material of Example 1 was filled in the pressure molding dies 300 in a dry atmosphere with a dew point of −60° C. and was uniaxially pressed at 400 MPa to produce a conductivity measurement cell of Example 1.

Lead wires were routed from each of the upper punch 303 and the lower punch 302 under a pressurized state and were connected to a potentiostat (VersaSTAT 4, manufactured by Princeton Applied Research) equipped with a frequency response analyzer to measure the ion conductivity at room temperature by an electrochemical impedance measurement method.

Figure 3:
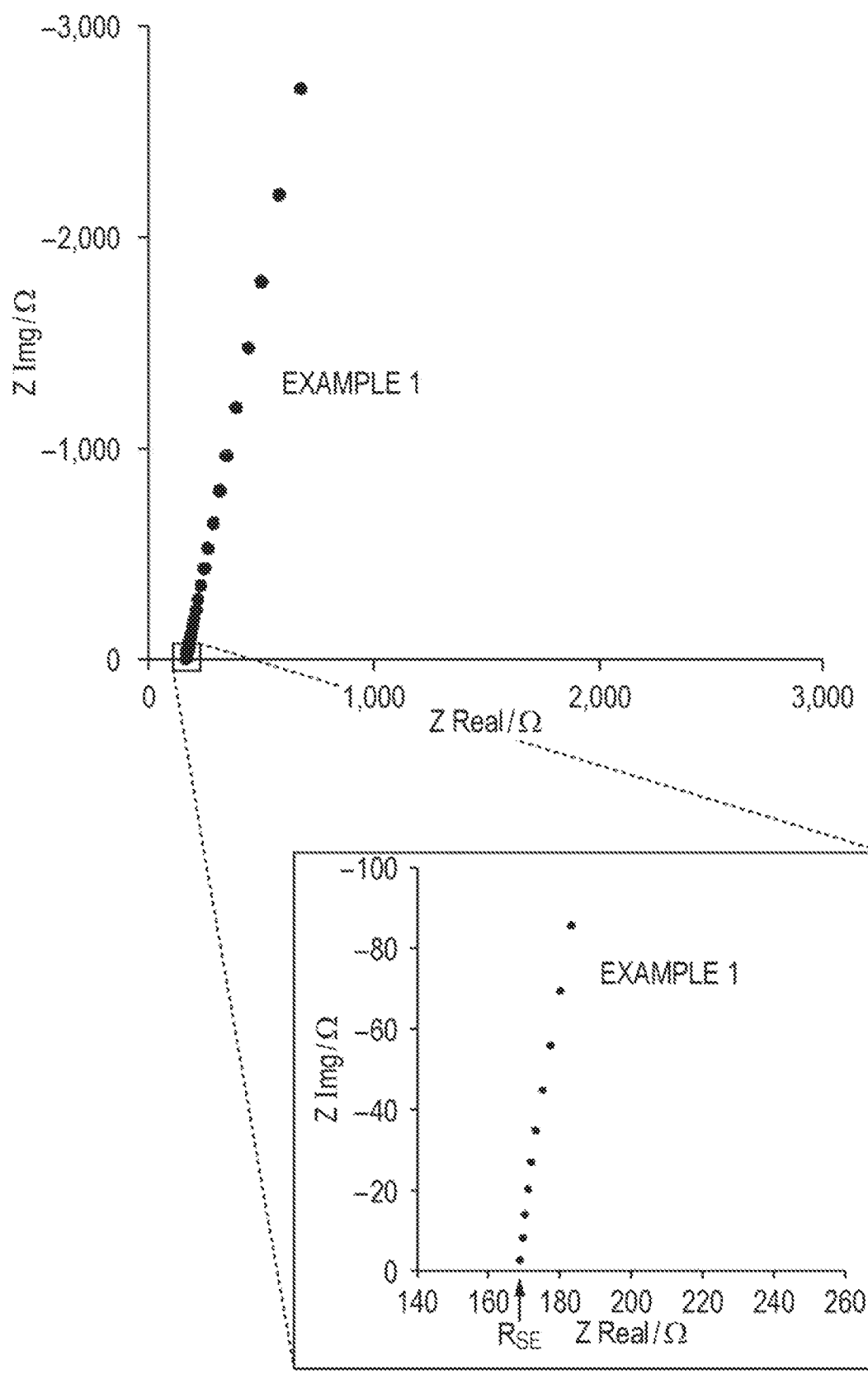
FIG. 3 is a graph showing the results of evaluation of ion conductivity by AC impedance measurement.

FIG. 3 shows a Cole-Cole diagram of the impedance measurement results.

In FIG. 3, the real value of impedance at the measurement point (indicated by the arrow in FIG. 3), at which the absolute value of the phase of complex impedance was the smallest, was regarded as the resistance value of the solid electrolyte of Example 1 to ionic conduction.

The ion conductivity was calculated using the resistance value of the electrolyte by the following expression (2): $\sigma=(R_{SE} \times S/t)^{-1}$.

Here, σ is the ion conductivity, S is the electrolyte area (in FIG. 2, the inner diameter of the frame 301), $R_{SE}$ is the resistance value of the solid electrolyte in the impedance measurement, and t is the thickness of the electrolyte (in FIG. 2, the thickness of the compressed body of a plurality of the solid electrolyte particles 100).

The ion conductivity of the solid electrolyte material of Example 1 measured at 25° C. was $4.7 \times 10^{-4}$ S/cm.

Production of Secondary Battery

The solid electrolyte material of Example 1 and LiCoO$_2$ as the active material were weighed in a volume ratio of 70:30 in an argon glove box and were mixed in an agate mortar to produce a mixture.

The solid electrolyte material of Example 1 equivalent to 700 μm thickness, 9.6 mg of the mixture, and 14.7 mg of an Al powder were stacked in an insulating outer cylinder in this order and were press-molded at a pressure of 300 MPa to prepare a first electrode and a solid electrolyte layer.

Subsequently, metal In (thickness: 200 μm) was stacked on the solid electrolyte layer on the opposite side to the side in contact with the first electrode, followed by press-molding at a pressure of 80 MPa to produce a layered product composed of the first electrode, the solid electrolyte layer, and a second electrode.

Then, stainless steel current collectors were disposed on the top and the bottom of the layered product, and current collecting leads were connected to the current collectors.

Finally, the inside of the insulating outer cylinder was shielded and sealed from the outside atmosphere with an insulating ferrule.

As described above, a secondary battery of Example 1 was produced.

Charge-Discharge Test

Figure 4:
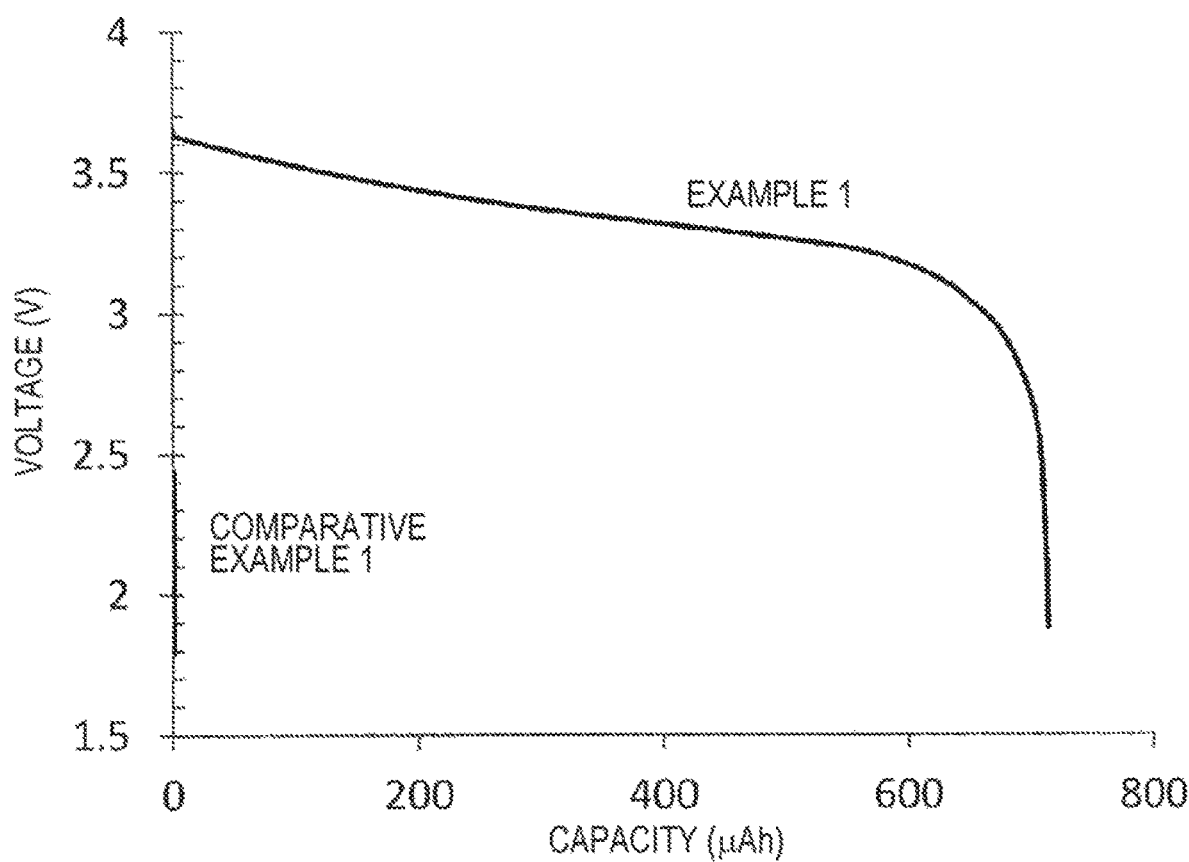
FIG. 4 is a graph showing initial discharge characteristics.

FIG. 4 is a graph showing initial discharge characteristics.

The results shown in FIG. 4 were measured by the following method.

That is, the secondary battery of Example 1 was placed in a thermostatic chamber at 25° C.

Current-constant charging was performed at a current value of 0.050 rate (20-hour rate) to the theoretical capacity of the battery, and the charging was stopped at a voltage of 3.6 V.

Then, discharging was likewise performed at a current value of 0.05C rate, and the discharging was stopped at a voltage of 1.9 V.

As a result of the above measurement, the initial discharge capacity of the secondary battery in Example 1 was 714 μAh.

Examples 2 to 26

Method for synthesis and evaluation of $Li_{3-3\delta-2a}Y_{1+\delta-a}M_aCl_{6-x-y}Br_xI_y$ will now be described.

Production of Solid Electrolyte Material

In Examples 2 to 26, raw material powders were weighed in a glove box kept in a dry and low-oxygen atmosphere with a dew point of −64° C. or less.

In Examples 2 to 21, raw material powders of LiCl, YCl$_3$, and MCl$_5$ were weighed in a molar ratio of LiCl:YCl$_3$:MCl$_5$=(3−3δ−2a):(1+δ−a):a.

In Example 22, raw material powders of LiBr, YBr$_3$, and TaBr$_5$ were weighed in a molar ratio of LiBr:YBr$_3$:TaBr$_5$=2.8:0.9:0.1.

In Examples 23 and 24, raw material powders of LiBr, YCl$_3$, YBr$_3$, and MCl$_5$ were weighed in a molar ratio of LiBr:YCl$_3$:YBr$_3$:MCl$_5$=(3−2a):(1−5/3a):2/3a:a.

In Examples 25 and 26, raw material powders of LiI, LiBr, YCl$_3$, YBr$_3$, and MCl$_5$ were weighed in a molar ratio of LiI:LiBr:YCl$_3$:YBr$_3$:MCl$_5$=2:(1−2a):(2/3−5a/3) ((1+2a)/3):a.

The "value of δ", "value of a", and "element represented by M" in each of Examples 2 to 26 are shown in Table 1 below.

In Examples 11 and 12, after ball milling, heat treatment was performed in an Ar atmosphere at 150° C. for 1 hour.

Except for the above, solid electrolyte materials in Examples 2 to 26 were produced by the same method as in Example 1.

Evaluation of Lithium Ion Conductivity

Conductivity measurement cells in Examples 2 to 26 were produced by the same method as in Example 1 in a glove box kept in a dry and low-oxygen atmosphere with a dew point of −60° C. or less.

Except for the above, the ion conductivity was measured by the same method as in Example 1.

The ion conductivities in Examples 2 to 26 are shown in Table 1 below. Production of secondary battery The solid electrolyte material in each of Examples 2 to 26 and LiCoO$_2$ as a positive electrode active material were weighed in a volume ratio of 30:70 in a glove box kept in a dry and low-oxygen atmosphere with a dew point of −90° C. or less and an oxygen level of 5 ppm or less and were mixed in an agate mortar to produce a positive electrode mixture of each of Examples 2 to 26.

Except for the above, a secondary battery in each of Examples 2 to 26 was produced by the same method as in Example 1.

Charge-Discharge Test

The secondary batteries in Examples 2 to 26 were subjected to the same charge-discharge test as in Example 1.

The initial discharge characteristics in Examples 2 to 26 were respectively equivalent to that in Example 1, and good charge and discharge characteristics were obtained.

Comparative Example 1

LiCl and FeCl$_2$ were used as the raw material powders of solid electrolyte and were mixed in a molar ratio of LiCl:FeCl$_2$=2:1.

Except for the above, the synthesis, evaluation, and analysis were respectively performed by the same methods as in Example 1.

The ion conductivity measured at 22° C. was 9×10$^{-6}$ S/cm.

In addition, as the mixture and the solid electrolyte to be used in the solid electrolyte layer, the solid electrolyte materials in Example 2 were used.

Except for the above, a secondary battery was produced and subjected to the charge-discharge test as in Example 1.

The secondary battery in Comparative Example 1 had an initial discharge capacity of 1 μAh or less, and no charge and discharge operation was observed.

Table 1 shows the constitution and the results of each evaluation in Examples 1 to 26 and Comparative Example 1.

TABLE 1

|  | Composition | Anion | δ | a | M | Synthesis | Conductivity (S/m) |
|---|---|---|---|---|---|---|---|
| Example 1 | Li$_{2.9}$Y$_{0.95}$Ta$_{0.05}$Cl$_6$ | Cl | 0 | 0.05 | Ta | BM | 4.7E−04 |
| Example 2 | Li$_{2.8}$Y$_{0.9}$Ta$_{0.1}$Cl$_6$ | Cl | 0 | 0.1 | Ta | BM | 5.1E−04 |
| Example 3 | Li$_{2.7}$Y$_{0.85}$Ta$_{0.15}$Cl$_6$ | Cl | 0 | 0.15 | Ta | BM | 4.6E−04 |
| Example 4 | Li$_{2.6}$Y$_{0.8}$Ta$_{0.2}$Cl$_6$ | Cl | 0 | 0.2 | Ta | BM | 1.7E−04 |

TABLE 1-continued

| | Composition | Anion | δ | a | M | Synthesis | Conductivity (S/m) |
|---|---|---|---|---|---|---|---|
| Example 5 | $Li_2Y_{0.5}Ta_{0.5}Cl_6$ | Cl | 0 | 0.5 | Ta | BM | 2.5E−04 |
| Example 6 | $Li_{1.6}Y_{0.3}Ta_{0.7}Cl_6$ | Cl | 0 | 0.7 | Ta | BM | 1.1E−05 |
| Example 7 | $Li_{4.4}Y_{0.45}Ta_{0.05}Cl_6$ | Cl | −0.5 | 0.05 | Ta | BM | 3.9E−05 |
| Example 8 | $Li_{3.76}Y_{0.63}Ta_{0.07}Cl_6$ | Cl | −0.3 | 0.07 | Ta | BM | 1.2E−04 |
| Example 9 | $Li_{2.16}Y_{1.08}Ta_{0.12}Cl_6$ | Cl | 0.2 | 0.12 | Ta | BM | 4.7E−04 |
| Example 10 | $Li_{1.2}Y_{1.35}Ta_{0.15}Cl_6$ | Cl | 0.5 | 0.15 | Ta | BM | 5.9E−05 |
| Example 11 | $Li_{4.4}Y_{0.45}Ta_{0.05}Cl_6$ | Cl | −0.5 | 0.05 | Ta | Sintering | 1.1E−04 |
| Example 12 | $Li_{3.76}Y_{0.63}Ta_{0.07}Cl_6$ | Cl | −0.3 | 0.07 | Ta | Sintering | 3.1E−04 |
| Example 13 | $Li_{2.9}Y_{0.9}Nb_{0.05}Cl_6$ | Cl | 0 | 0.05 | Nb | BM | 5.5E−04 |
| Example 14 | $Li_{2.8}Y_{0.95}Nb_{0.1}Cl_6$ | Cl | 0 | 0.1 | Nb | BM | 4.6E−04 |
| Example 15 | $Li_{2.7}Y_{0.85}Nb_{0.15}Cl_6$ | Cl | 0 | 0.15 | Nb | BM | 4.3E−04 |
| Example 16 | $Li_2Y_{0.5}Nb_{0.5}Cl_6$ | Cl | 0 | 0.5 | Nb | BM | 8.0E−05 |
| Example 17 | $Li_{1.6}Y_{0.3}Nb_{0.7}Cl_6$ | Cl | 0 | 0.7 | Nb | BM | 1.0E−05 |
| Example 18 | $Li_{4.45}Y_{0.475}Nb_{0.025}Cl_6$ | Cl | −0.5 | 0.025 | Nb | BM | 3.5E−05 |
| Example 19 | $Li_{3.83}Y_{0.665}Nb_{0.035}Cl_6$ | Cl | −0.3 | 0.035 | Nb | BM | 1.1E−04 |
| Example 20 | $Li_{2.28}Y_{1.14}Nb_{0.06}Cl_6$ | Cl | 0.2 | 0.06 | Nb | BM | 4.1E−04 |
| Example 21 | $Li_{1.35}Y_{1.425}Nb_{0.075}Cl_6$ | Cl | 0.5 | 0.075 | Nb | BM | 5.4E−05 |
| Example 22 | $Li_{2.8}Y_{0.9}Ta_{0.1}Br_6$ | Br | 0 | 0.1 | Ta | BM | 4.2E−04 |
| Example 23 | $Li_{2.8}Y_{0.9}Ta_{0.1}Cl_3Br_3$ | Cl, Br | 0 | 0.1 | Ta | BM | 6.4E−04 |
| Example 24 | $Li_{2.9}Y_{0.95}Nb_{0.05}Cl_3Br_3$ | Cl, Br | 0 | 0.05 | Nb | BM | 7.2E−04 |
| Example 25 | $Li_{2.8}Y_{0.9}Ta_{0.1}Cl_2Br_2I_2$ | Cl, Br, I | 0 | 0.1 | Ta | BM | 1.8E−03 |
| Example 26 | $Li_{2.9}Y_{0.95}Nb_{0.05}Cl_2Br_2I_2$ | Cl, Br, I | 0 | 0.05 | Nb | BM | 2.1E−03 |
| Comparative Example 1 | $Li_2FeCl_4$ | Cl | | | | BM | 9E−06 |

Consideration

It was demonstrated that in Examples 1 to 26, the ion conductivities at near room temperature were $1\times10^{-5}$ S/cm or more, i.e., high compared to Comparative Example 1.

In particular, when the substitution amount a of M defined in formula (1) is within a range of 0.025≤a≤0.7, higher ion conductivity is exhibited. Comparison of Examples 1 to 6 and 13 to 17 demonstrates that when the value of a is within a range of 0.05≤a≤0.5, higher ion conductivity is exhibited.

In addition, when the value of δ indicating the amount of Li deficiency from the stoichiometric ratio is −0.5≤δ≤0.5, higher ion conductivity is exhibited, Comparison of Examples 7 to 10 and 18 to 21 demonstrates that when the value of δ is within a range of −0.3≤δ≤0.2, higher ion conductivity is exhibited.

In addition, the charge and discharge operation of the battery was observed at room temperature in all Examples 1 to 26. In contrast, in Comparative Example 1, almost no discharge capacity was gained, and no battery operation was observed. Furthermore, since the materials in Examples 1 to 26 do not include sulfur as the constituent element, hydrogen sulfide is not generated.

According to the above, it is demonstrated that a solid electrolyte material according to the present disclosure does not generate hydrogen sulfide and shows high lithium ion conductivity and is thus an electrolyte material allowing good charge and discharge operation.

What is claimed is:

1. A solid electrolyte material represented by compositional formula (1):

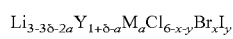

$Li_{3-3\delta-2a}Y_{1+\delta-a}M_aCl_{6-x-y}Br_xI_y$ where, M is at least one selected from the group consisting of Ta and Nb; and
−1<δ<1,
0<a<1.2,
0<(3−3δ−2a),
0<(1+δ−a),
0≤x≤6,
0≤y≤6, and
(x+y)≤6
are satisfied.

2. The solid electrolyte material according to claim 1, wherein
0.025≤a≤0.7 is satisfied.

3. The solid electrolyte material according to claim 2, wherein
0.05≤a≤0.5 is satisfied.

4. The solid electrolyte material according to claim 1, wherein
0.5≤δ≤0.5 is satisfied.

5. The solid electrolyte material according to claim 4, wherein
−0.3≤δ≤0.2 is satisfied.

6. A battery comprising:
a positive electrode;
a negative electrode; and
an electrolyte layer provided between the positive electrode and the negative electrode, wherein
at least one selected from the group consisting of the positive electrode, the negative electrode, and the electrolyte layer contains the solid electrolyte material according to claim 1.

* * * * *